(12) United States Patent
Lowney et al.

(10) Patent No.: US 10,331,484 B2
(45) Date of Patent: Jun. 25, 2019

(54) DISTRIBUTED DATA PLATFORM RESOURCE ALLOCATOR

(71) Applicant: Bank of America Corporation, Charlotte, NC (US)

(72) Inventors: Todd Lowney, Jacksonville, FL (US); Velmurugan Vinayakam, Concord, CA (US); Pradeepa Shanmugam, Jacksonville, FL (US); Jerome M. Zott, Glastonbury, CT (US); Gopi Krishna Dogiparti, Hyderbad (IN); Rakesh K. Joshi, Hyderbad (IN); Sai Karthik Nanduri, Andra Pradesh (IN); Vigneshvaran Ramalingam, Pondicherry (IN); Arun Prasath Govindarajulu, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 15/812,911

(22) Filed: Nov. 14, 2017

(65) Prior Publication Data

US 2019/0146839 A1    May 16, 2019

(51) Int. Cl.
*G06F 9/50* (2006.01)
(52) U.S. Cl.
CPC .............. *G06F 9/50* (2013.01); *G06F 9/5016* (2013.01); *G06F 9/5027* (2013.01); *G06F 2209/505* (2013.01)
(58) Field of Classification Search
None
See application file for complete search history.

(56) References Cited

U.S. PATENT DOCUMENTS

| | | | |
|---|---|---|---|
| 8,676,946 B1 * | 3/2014 | Deadwiler | H04L 41/22 709/220 |
| 8,874,600 B2 | 10/2014 | Gupta et al. | |
| 9,081,826 B2 | 7/2015 | Murthy et al. | |
| 9,147,373 B2 | 9/2015 | Cunningham et al. | |
| 9,172,608 B2 | 10/2015 | Zeyliger et al. | |

(Continued)

OTHER PUBLICATIONS

"What is Cassandra," http://cassandra.apache.org/, Retrieved on Oct. 25, 2017.

(Continued)

*Primary Examiner* — Wynuel S Aquino
(74) *Attorney, Agent, or Firm* — Weiss & Arons LLP; Michael A. Springs, Esq.

(57) ABSTRACT

A method for identifying applications operating in contravention to historic operation standards is provided. The method may include retrieving operation system log data from a plurality of operating system logs. The method may include retrieving job scheduling log data from a plurality of job scheduling logs on the first level. The method may include retrieving platform data from a distributed data platform on a second level. The method may include combining the operating system log data, the job scheduling log data and the platform data. The method may identify an application operating in contravention to historic operation standards. The method may also identify at least one user identifier or service identifier associate with the application. The method may terminate and/or flag the application for remediation.

16 Claims, 3 Drawing Sheets

(56) References Cited

U.S. PATENT DOCUMENTS

| | | | |
|---|---|---|---|
| 9,342,557 B2 | 5/2016 | Kornacker et al. | |
| 9,361,344 B2 | 6/2016 | Murthy et al. | |
| 9,727,355 B2 | 8/2017 | Holler et al. | |
| 2012/0166624 A1* | 6/2012 | Suit | G06F 9/5077 709/224 |

OTHER PUBLICATIONS

"Apache Hive TM," http://hive.apache.org/, Retrieved on Oct. 25, 2017.
"Apache Impala (incubating)," https://www.cloudera.com/products/open-source/apache-hadoop/impala.html, Retrieved on Oct. 25, 2017.
"Apache Kafka," https://www.cloudera.com/products/open-source/apache-hadoop/apache-kafka.html, Retrieved on Oct. 25, 2017.
"Apache Sentry," https://www.cloudera.com/products/open-source/apache-hadoop/apache-sentry.html, retrieved on Oct. 25, 2017.
"Apache Sqoop," https://www.cloudera.com/products/open-source/apache-hadoop/apache-sqoop, Retrieved on Oct. 25, 2017.
"Apache ZooKeeper™," http://zookeeper.apache.org/, Retrieved on Oct. 25, 2017.
"CDH Components," https://www.cloudera.com/products/open-source/apache-hadoop/key-cdh-components.html, Retrieved on Oct. 25, 2017.
"Apache Spark—Lightning-fast cluster computing," http://spark.apache.org/downloads.html, Retrieved on Oct. 25, 2017.
"Open Database Connectivity," https://wikipedia.org/wiki/Open_Database_Connectivity#ODBC-to-JDBC_.280DBC-JDBC.29_bridges, Wikimedia Foundation, Inc., Nov. 3, 2017.
"Apache Flume," https://www.cloudera.com/products/open-source/apache-hadoop/apache-flume.html, Retrieved on Oct. 25, 2017.
"Apache Hadoop," http://hadoop.apache.org/, Retrieved on Oct. 25, 2017.
"What is Autosys? Why do we need to use autosys?" http://www.geekinterview.com/question_details/54680, Retrieved on Nov. 3, 2017.
Google Search: "What is included in autosys log," https://www.google.com/search?ei=nIT8WfrjOebQjwSS6YzwAQ&Q=what+is+included+in+an+autosys+log&oq, Retrieved on Nov. 3, 2017.

* cited by examiner

DISTRIBUTED DATA PLATFORM RESOURCE ALLOCATOR

FIELD OF TECHNOLOGY

This disclosure relates to resource allocation. Specifically, this disclosure relates to resource allocation within a distributed data environment.

BACKGROUND

Distributed data environments, such as Apache™ Hadoop®, enable distributed processing of large data sets across clusters of computers. Each cluster of computers is often associated with a tenant. Distributed data environments are often associated with multiple tenants. Each tenant typically accesses the same set of resources included in the distributed data environment.

Distributed data environments also include components. The components are shared by the multiple tenants. The components include Yarn™, MapReduce™, Cassandra™, Hive™, Spark™, ZooKeeper™, Flume™, Impala™, Kafka™, Sqoop™ and Sentry™.

A cluster of computers includes one or more computers. Each computer includes one or more applications. At times, an application operates in a resource-draining manner. The resource-draining manner is understood to mean that the application uses a relatively large amount of the distributed data environment's resources. A resource-draining application causes failures to occur within the distributed data environment.

It may be difficult to determine which applications are resource-draining and which applications are operating efficiently. Therefore, a system and method for determining the efficiency of an application would be desirable. It may be further desirable for the system and method to remediate the resource-draining application. Such a system and method may reduce the amount of failures that occur within the distributed data environment.

SUMMARY OF THE DISCLOSURE

A method for efficiently allocating a plurality of resources within a distributed data platform is provided. Examples of resources may include CPU (central processing unit) cycles, hard drive memory space and cache memory space. The distributed data platform may include a plurality of clusters. Each cluster may include a node. A node may be a computer. Each node may be configured to execute an application.

The method may include determining a critical threshold for each of the plurality of resources. Each critical threshold may be a value of a percentage of use of the resource. Each critical use threshold may be a distinct percentage of use of the resource. Each critical threshold may be the same percentage of use of the resource. Each critical use threshold may be determined based on a variety of factors. The variety of factors may include historic application use.

When the percentage of use of a resource exceeds the critical threshold, an outage may occur within a first predetermined time period. The outage may occur at the application level. The outage may occur at the node level. The outage may occur at the cluster level. The outage may occur at level of the plurality of clusters. The outage may occur at the platform level.

The method may include determining a warning threshold for each of the plurality of resources. Each warning threshold may be a value of the percentage of use of the resource. Each warning threshold may be a distinct percentage of use of the resource. Each warning threshold may be the same percentage of use of the resource. The percentage of use of the resource may reach the critical threshold within a second predetermined time period when the percentage of use of the resource exceeds the warning threshold and is less than the critical threshold.

The method may include determining an underuse threshold for each of the plurality of resources. Each underuse threshold may be a value of the percentage of use of the resource. When the percentage of use of the resource is below the underuse threshold, more than a predetermined portion of the resource may be idle.

The method may include receiving resource data segments. Each resource data segment may include data relating to the current use of one of the plurality of resources. Each resource data segment may correspond to a resource. Each resource data segment may include a value of the percentage of use of the resource. Each resource data segment may include data relating to an application utilizing the resource. Each resource data segment may also include data relating to a node associated with the application utilizing the resource.

The method may include determining whether the resource is below the underuse threshold, above the underuse threshold and below the warning threshold, above the warning threshold and below the critical threshold, or above the critical threshold. The determination may be based on a received value of the percentage of use of the resource.

When the percentage of use of the resource is determined to be below the underuse threshold, the method may include flagging the unused portion of the resource as unallocated. When the percentage of use of the resource is determined to be below the underuse threshold, the method may also include re-allocating the unused portion of the resource. Re-allocating the unused portion may enable to resource to be used by a different application on the platform.

When the percentage of use of the resource is determined to be above the underuse threshold and below the warning threshold, the method may include flagging the use of the resource as satisfactory. When the percentage of use of the resource is determined to be above the underuse threshold and below the warning threshold, the method may also include maintaining the execution of the application within such a satisfactory range.

When the percentage of use of the resource is determined to be above the warning threshold and below the critical threshold, the method may include determining whether the application is conforming to historic operation standards as derived from historic application information. When the percentage of use of the resource is determined to be above the warning threshold and below the critical threshold and the application is determined to be operating in conformance with the historic operation standards, the method may include allocating one or more additional resources to the utilizing application. The additional resource allocation may enable the application to continue to operate. When the percentage of use of the resource is determined to be above the warning threshold and below the critical threshold and the application is determined to be operating at an efficiency level that is less than a predetermined threshold level of efficiency, the method may include flagging the utilizing application for remediation. When the percentage of use of the resource is determined to be above the warning threshold and below the critical threshold, the method may include transmitting a message to a plurality of stakeholders. The message may include the determination of whether the utilizing application is conforming to historic operation standards as derived from historic application information. The message may include data relating to the additional resource allocated to the utilizing application. The message may also include data relating to the flagging the utilizing application for remediation. The message may be transmitted over a communications network to the plurality of stakeholders in a non-urgent manner.

When the percentage of use of the resource is determined to be above the critical threshold, the method may include determining whether the utilizing application is conforming to historic operation standards as derived from historic application information. When the percentage of use of the resource is determined to be above the critical threshold, the method may include allocating one or more additional resources to the utilizing application when the application is determined to be conforming to historic operation standards. The additional resource allocation may enable the application to continue to operate. When the percentage of use of the resource is determined to be above the critical threshold and the application is determined to be operating at an efficiency level that is less than a predetermined threshold level of efficiency, the method may include flagging the utilizing application for remediation. When the percentage of use of the resource is determined to be above the critical threshold, the method may include transmitting a second message to the plurality of stakeholders. The second message may include the determination of whether the utilizing application is conforming to historic operation standards as derived from historic application information. The second message may also include data relating to the additional resource allocated to the utilizing application. The second message may also include data relating to the flagging of the utilizing application for remediation. The second message may be transmitted over a communications network to the plurality of stakeholders. The second message may be transmitted in an urgent manner.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
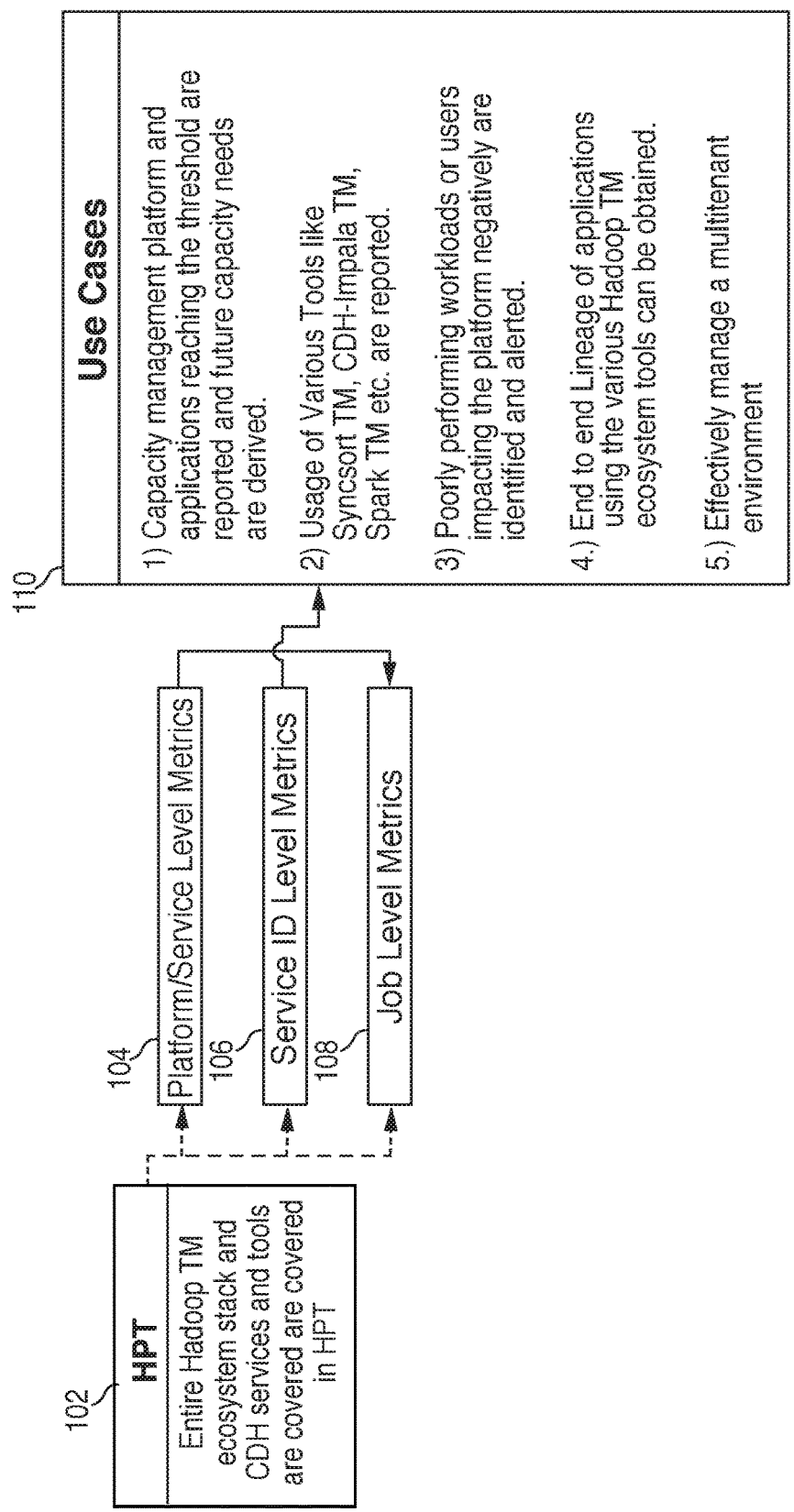
FIG. 1 shows an illustrative flow chart in accordance with principles of the invention.

A distributed data platform is provided. The distributed data platform may include a plurality of clusters. Each cluster may include a node. Each node may be configured to execute an application.

The distributed data platform may also include a plurality of resources. The distributed data platform may also include a processor. The processor may be configured to determine a critical threshold, a warning threshold and an underuse threshold for each of the plurality of resources.

The critical threshold may correspond to a percentage of use of the resource. When the percentage of use is greater than the critical threshold, the platform will incur an outage within a first predetermined time period. The outage may occur at the application. The outage may occur at the node. The outage may occur at a cluster including the node. The outage may occur at the plurality of clusters. The outage may occur at the platform.

The warning threshold may also correspond to a percentage of use of the resource. When the percentage of use is greater than the warning threshold and less than the critical threshold, the percentage of use may reach the critical threshold within a second predetermined time period.

The underuse threshold may also correspond to a percentage of use of the resource. When the percentage of use is below the underuse threshold, a portion of the resource may be unused.

The platform may include a receiver. The receiver may be configured to receive resource data segments. The resource data segments may relate to current use of each resource. Each resource data segment may correspond to a resource to a resource. Each resource data segment may include data. A portion of the data may correspond to a percentage of use of the resource. A portion of the data may correspond to an application utilizing the resource. A portion of the data may correspond to a node associated with the application. A portion of the data may correspond to a cluster associated with the node.

The processor may be configured to execute additional actions for each of the plurality of resources. The percentage of use of the resource may be received in the resource data segment relating to the resource. When the percentage of use received is below the underuse threshold, the processor may flag a portion of the unused portion as unallocated. When the percentage of use received is below the underuse threshold, the processor may also re-allocate the unused portion.

When the percentage of use received is above the underuse threshold and below the warning threshold, the processor may flag the use of the resource as satisfactory. When the percentage of use received is above the underuse threshold and below the warning threshold, the processor may maintain the execution of the application.

When the percentage of use received is above the warning threshold, the processor may determine whether the application is conforming to historic operation standards as derived from historic application information. When the application is determined to be operating in conformance with historic operation standards, the processor may allocate an additional resource to the application. The additional resource may enable the application to continue to operate in conformance with the historic operation standards. When the application is determined to be operating in contravention to historic operation standards, the processor may flag the application for remediation.

When the percentage of use received is above the warning threshold, the processor may transmit a message over a communications network to a plurality of stakeholders. The message may include the determination of whether the application is conforming to historic operation standards as derived from historic application information. When the application is determined to be in conformation with historic operation standards, the message may include data relating to the additional resource. When the application is determined to be operating in contravention to historic operation standards, the message may include the flagging of the application for remediation. The flagging the application for remediation may include terminating the application. In some embodiments, the termination may preferably only be implemented in the event that the resource use is above the critical threshold.

When the percentage of use of the resource received is above the warning threshold and below the critical threshold, the message may be a first message transmitted in a non-urgent manner. The non-urgent manner may include a daily email transmission. The non-urgent manner may include a weekly email transmission. The non-urgent manner may include a monthly email transmission. The non-urgent manner may include any other suitable email transmission schedule. The email may be transmitted on the determined schedule until the resource use is determined to be below the warning threshold.

When the percentage of use received is above the critical threshold, the message may be a second message transmitted in an urgent manner. The urgent manner may include an hourly email transmission. The urgent manner may include an email transmission each minute. The urgent manner may include any other suitable email transmission schedule. The email may be transmitted on the determined schedule until the resource use is determined to be below the critical threshold.

A machine-learning algorithm may be implemented on the processor. The machine-learning algorithm may be configured to retrieve historic resource data segments. The machine-learning algorithm may be configured to allocate the plurality of resources based on the historic resource data segments. The machine-learning algorithm may also be configured to flag a portion of the resources as unused based on the historic resource data segments. The machine-learning algorithm may ensure that resources on the platform are being used efficiently. The machine-learning algorithm may also be continuously re-allocating resources based on the different changing requirements of the various applications.

In some embodiments, an average of the plurality of warning thresholds may be determined. In these embodiments, an average of the percentage of use of the plurality of resources may also be determined. The machine-learning algorithm may reduce the average of the percentage of use of the plurality of resources to less than the average of the plurality of warning thresholds. The machine-learning algorithm may reduce the percentage of use of a resource to less than the critical threshold.

In some embodiments, each cluster may include a plurality of critical thresholds. The plurality of critical thresholds may be comprised of each critical threshold for each resource included in each application included in each node included on the cluster. For a specific cluster, an average of the plurality of critical thresholds may be determined. In these embodiments, the machine-learning algorithm may reduce the average of the percentage of use of the plurality of resources to less than the average of the plurality of critical thresholds.

The system may monitor how various tenants are using the platform. The monitoring may be based on a user ID. Monitoring based on user ID may clarify which users are using which resources on the platform. Monitoring based on user ID may also identify which applications are performing poorly. The monitoring data may be used to report resource utilizing and trending analysis. The monitoring data may be used to identify potential problems at the various resources and remediate those problems before the resources reach critical thresholds.

The system may monitor how various tenants are using the platform. The monitoring may be based on a user ID. Monitoring based on user ID may clarify which users are using which resources on the platform. Monitoring based on user ID may also identify which applications are performing poorly. The data generated by the monitoring, also referred to herein as monitoring data, may be used to report resource utilization and trending analysis. The monitoring data may be used to identify potential problems at the various resources and remediate those problems before the resources reach critical thresholds. The monitoring data may also be used for a variety of other purposes.

In an exemplary use case, the monitoring data may include information relating to the synchronization between a production platform and a disaster recovery platform. A production platform may be in communication with a disaster recovery platform. Data from the production platform may be replicated to the disaster recovery platform. In the event of a failure on the production platform, data may be recovered from the disaster recovery platform. Also, in the event of a failure on the production platform, the disaster recovery platform may perform executable actions in place of the disaster recovery platform.

The monitoring data may include information relating to a discrepancy between the production platform and the disaster recovery platform. If a discrepancy is determined, the system may replicate the unsynchronized portion of the data into the disaster recovery platform. Replication of the unsynchronized portion of data from the production platform to the disaster recovery platform may ensure that the disaster recovery platform is up-to-date in the event of an outage on the production platform.

A system associated with the resource allocator may include a non-transitory machine readable memory. The non-transitory memory may store computer executable instructions. The system may include a processor configured to execute the computer executable instructions. For example, a processor circuit may be embedded in an integrated circuit board of the system. The processor may control overall operation of the system and its associated components.

The system may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the system to perform various functions. For example, the non-transitory memory may store software used by the system, such as an operating system, application programs, web browser and a database. Alternatively, some or all of computer executable instructions of the resource allocator may be embodied in hardware or firmware components of the system.

Software application programs, which may be used by the system, may include computer executable instructions for invoking user functionality related to communication, such as email, short message service ("SMS"), and voice input and speech recognition applications. Application programs may utilize one or more algorithms that analyze computational loads processed by the system, computational loads processed devices that access the data transport system, filter confidential content or any other suitable tasks.

The system may operate in a networked environment. For example, the system may support network connections to other systems within the complex web and patch servers storing software patches. The system may support establishing network connections to one or more remote computers. Such remote computers may be nodes on a network. The nodes may be personal computers or servers that include many or all of the elements described above relative to the system.

The network connections may include a local area network ("LAN") and a wide area network ("WAN"), and may also include other networks. When used in a LAN networking environment, the system may be connected to the LAN through a network interface or adapter. The communication circuit may include the network interface or adapter.

When used in a WAN networking environment, the system may include a modem or other means for establishing communications over a WAN, such as the Internet. It will be appreciated that the existence of any of various well-known protocols such as TCP/IP, Ethernet, FTP, HTTP and the like is presumed, and the system can be operated in a client-server configuration to permit a user to retrieve web pages from a web-based server. Web browsers can be used to display and manipulate data on web pages.

The system may include various other components, such as a battery, a speaker, and antennas (not shown). For example, network nodes may be portable devices such as a laptop, a tablet, chat-bot, a smartphone or any other suitable device for receiving, storing, transmitting and/or displaying relevant information.

The system may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The system may utilize computer-executable instructions, such as program modules, executed by a computer. Generally, program modules include routines, programs, objects, components, data structures, etc. that perform particular tasks or implement particular data types. The system may be operational with distributed computing environments where tasks are performed by remote processing devices that are linked through a communications network. In a distributed computing environment, program modules may be located in both local and remote computer storage media including memory storage devices.

A device that accesses the system may include one or more features of the system. For example, an accessing device may be a smart phone, desktop computer or other device. The accessing device may be operated by a financial center employee.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow diagram. HPT 102 may be an acronym for Hadoop Platform Tool. HPT 102 may collect data from multiple sources, such as Hadoop ecosystem and CDH ("Cloudera Distributed Hadoop") services and tools. Application performance data may be included in the collected data.

HPT 102 may load the data into views, such as view 104, view 106 and view 108. Each view may represent resource metrics and/or trending analysis on a different level, such as a platform level, service level, service identification level, job level and/or user identification level. View 104 may show resource metrics and trending analysis on a platform or service level. View 106 may show resource metrics and trending analysis on a service ID level. View 108 may show resource metrics and trending analysis on a job level.

Use cases for the data included in views 104, 106 and 108 may be shown at 110. Use cases may include managing resource capacity on the platform. Use cases may also include reporting and/or remediating applications that reach or are nearing one or more thresholds. Use cases may also include deriving future application capacity requirements from historic application or historic platform information.

Also shown at 110, may be reporting and managing efficiency and capacity of platform components, such as Syncsort™, CDH-Impala™ and Spark™. Data relating to the efficiency and capacity management of the various platform components may be transmitted to the platform component owners in order to improve the components.

Identifying workloads and/or users that are impacting the platform in a negative manner may be another use case shown at 110. The system may trigger alerts upon the identification of workloads and/or users that impact the platform in a negative manner.

Use cases 110 may also include obtaining end-to-end data lineage of applications that use the distributed data platform. The data lineage may be derived from the components used by the application. The data lineage may include file transfer information—i.e., how a specific file was transferred from a source system to a target system. The data lineage may also include system of record information.

HPT 102 may enable effective management of a multi-tenant environment, as included in the use cases shown at 110.

Figure 2:
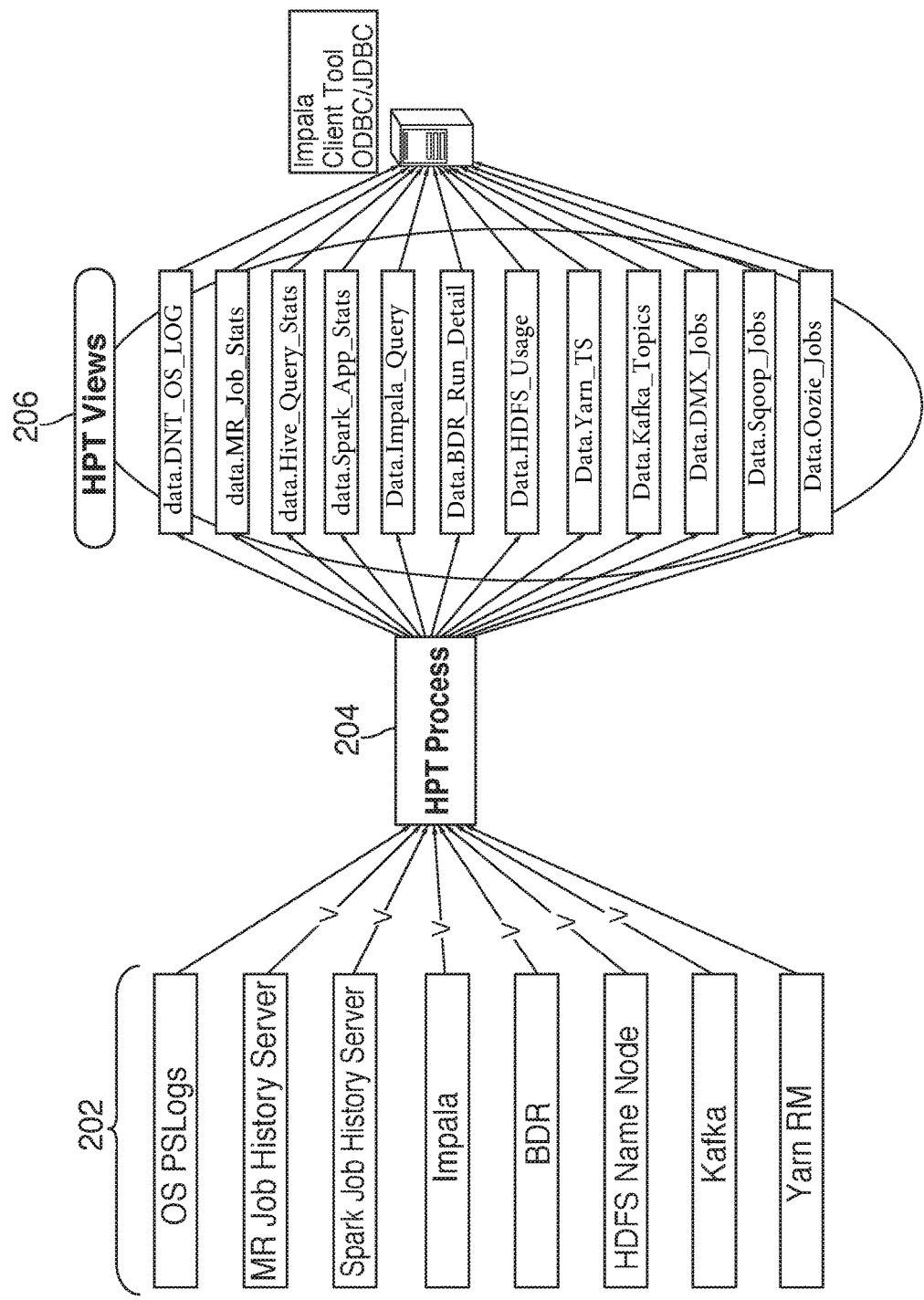
FIG. 2 shows another illustrative flow chart in accordance with principles of the invention.

FIG. 2 shows a process flow. Each of sources 202 may be monitored by HPT (Hadoop Platform tool) process 204. Outputs from each of sources 202 may be processed within HPT process 204. The output of the processing may be displayed to a user in one or more HPT views 206.

Sources 202 may include OS PSLogs (Operating system process logs). Operating system process logs may be retrieved from the operating systems of one or more of the clusters. An operating system log may include data relating to usage of operating system components. An exemplary process log may include CPU usage by user ID, memory usage by job id, etc.

Sources 202 may also include Autosys™ logs (not shown). Autosys™ may be a job controls system for scheduling, monitoring and reporting jobs on a computer system. Autosys™ may generate logs. The logs may enable a user to view details of jobs executed by Autosys™. It should be appreciated that the OS PSLogs and the Autosys™ logs may be located outside of the distributed data platform. The system may merge the OS PSLogs and the Autosys™ logs with the output from the distributed data platform components. The merged data may provide information relating to problems on the cluster. By merging the data, the system can identify and isolate particular data segments in order to determine a greater level of granularity relating to application, platform and system information. In one embodiment, the system can associate specific user identifiers to applications operating in contravention to historic operation standards.

Data retrieved from Autosys™ may generate data lineage for an application. Autosys™ logs may include data relating to current data loading of particular job to a particular table. Autosys™ logs may include information relating to the pairing between jobs and tables. If an issue exists at a particular table, the Autosys™ log information may be useful in determining the origin on the issue. Therefore, pairing information may be useful when an issue exists with a particular table.

MR (MapReduce™) Job History Server may be included in sources 202. MapReduce™ may be a component or tool for batch distributed processing. MapReduce™ may include mappers and reducers. A mapper may be used to split a file across various nodes for processing. A reducer may be used to combine the processed file segments. Each mapper may use one CPU core. Each reducer may also use one CPU core. MapReduce™ may read and write from disk.

Another component or tool for batch distributed processing may be Spark™ Job History Server. Spark™ may also be included in sources 202. Spark™ may execute batch distributed processing in significantly faster than MapReduce™ because Spark™ may read and/or write to or from memory while MapReduce™ may read and/or write to or from disk. It should be appreciated that certain distributed data platform versions may be compatible with Map Reduce™, while other versions may be compatible with Spark™.

Queries may be performed with the distributed data platform. Impala™, included in sources 202, may be a query engine configured to perform queries on the platform. It should be appreciated that the Impala™ query engine may be configured to run queries from memory.

Sources 202 may also include BDR (business data recovery). Business data recovery may include platform information relating to a disaster recovery platform as discussed above.

Sources 202 may include HDFS (Hadoop Data file statistics) name node. HDFS name node may retrieve data relating to file statistics. The data may be resident on a name node.

Kafka™, an open source streaming tool, may also be included in sources 202. Kafka™ may be a messaging system. The messaging system may include information relating to where data flows and the usage of the data by consumers.

Sources 202 may include Yarn™. Yarn™ may manage the CPU and memory across several tenants. Each tenant may have a cap on its CPU allowance and memory allowance. Yarn™ may allocate CPU and memory based on the cap information.

HPT process 204 may pull data from other sources (not shown) such as Hive™. Hive™ may be a query engine for querying data on the cluster. An exemplary data element retrieved from Hive™ may include the return time of a specific query.

HPT process 204 may also pull data from DMX (digital multiplex) by Syncsort™ (not shown). DMX may be a vendor product that performs batch ETL (extract, transform and load) processing. ETL processing may include pulling data from a source system and placing the data into a data warehouse. DMX may include graphical user interface ("GUI"). The GUI may assist programmers in code generation. DMX may be known as a code generator.

Sqoop™ may be another source of data for HPT process 204. Sqoop™ may be a data connector tool for connecting to other relational database systems. Sqoop may pull information from one cluster and push information to another cluster.

Information from Oozie™ may also transmitted to HPT process 204. Oozie™ may be a job scheduling and pipelining tool for a distributed data platform.

HPT views 206 may include different views on an application or plurality of applications. The views may provide data to developers. The developers may reference the data and improve their applications based on the data. The views may also be visible to a machine-learning algorithm. The machine-learning algorithm may enhance the platform performance based on the information available in views 206.

Impala Client tool ODBC/JDBC (open database connectivity/Java™ database connectivity), shown at 208 may be an API (application programming interface). The API may enable a user to access HPT views 206

Figure 3:
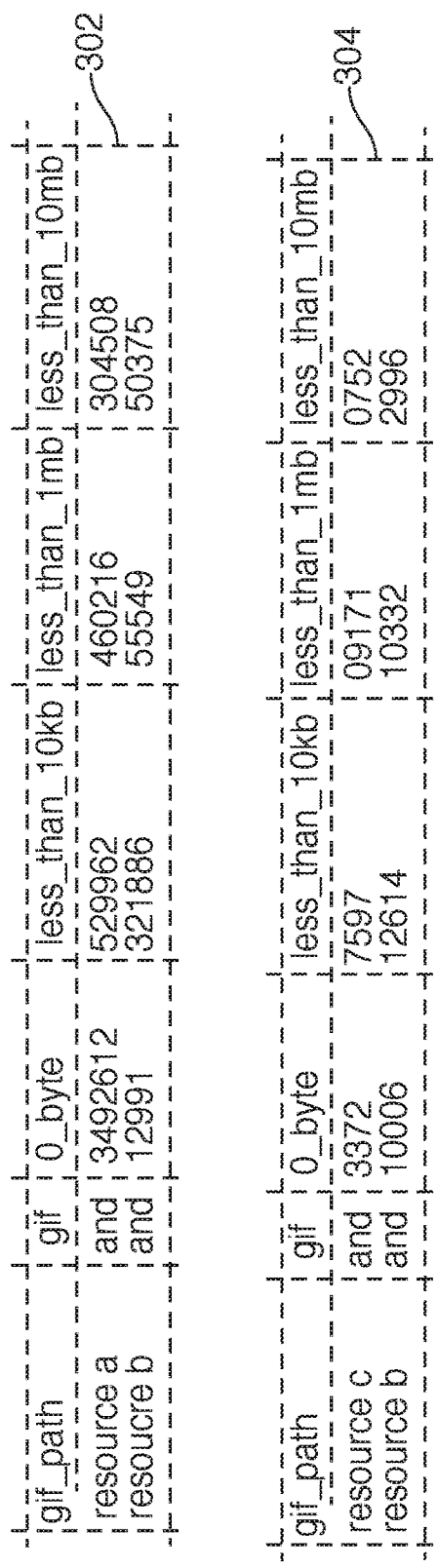
FIG. 3 shows an illustrative diagram in accordance with principles of the invention.

FIG. 3 shows sample table 302 and sample table 304. Sample tables 302 and 304 may include usage information relating to two distinct applications. In tables 302 and 304, metrics are shown relating to memory and/or CPU usage are shown. Information that may be included in a table may include a number of CPU cores being used compared to the number of CPU cores available to that application. Such information may also include a number of CPU cores being used compared to the number of CPU cores available on the cluster.

Thus, systems and methods for a platform resource allocator have been provided. Persons skilled in the art will appreciate that the present invention can be practiced by other than the described embodiments, which are presented for purposes of illustration rather than of limitation. The present invention is limited only by the claims that follow.

What is claimed is:

1. A method for efficiently allocating a plurality of resources within a distributed data platform, the distributed data platform including a plurality of clusters, each cluster including at least one node, each node of the at least one node configured to execute at least one application, the method comprising:

determining for each of the plurality of resources:

a critical threshold, being a percentage of use of the resource wherein, when the percentage of use is greater than the critical threshold, the platform will incur an outage within a first predetermined time period, the outage incurred in at least one of:

the at least one application;
the at least one node;
a cluster including the node;

the plurality of clusters; and
the platform;
a warning threshold, being a percentage of use of the resource wherein, when the percentage of use is greater than the warning threshold and less than the critical threshold, the percentage of use will reach the critical threshold within a second predetermined time period; and
an underuse threshold, being a percentage of use of the resource wherein, when the percentage of use is below the underuse threshold, at least a predetermined portion of the resource is an unused portion;
receiving resource data segments relating to current use of each of the plurality of resources, each resource data segment corresponding to a resource and including data corresponding to:
a percentage of use of the resource;
at least one application utilizing the resource;
at least one node associated with the at least one application; and
at least one cluster associated with the at least one node; and
for each of the plurality of resources:
when the percentage of use of the resource received in a resource data segment relating to the resource is below the underuse threshold:
flagging at least a part of the unused portion as unallocated; and
re-allocating the unused portion;
when the percentage of use of the resource received in the resource data segment relating to the resource is above the underuse threshold and below the warning threshold:
flagging use of the resource as satisfactory; and
maintaining execution of the at least one application; and
when the percentage of use of the resource received in the resource data segment relating to the resource is above the warning threshold:
determining whether the at least one application is conforming to historic operation standards as derived from historic application information;
when the application is determined to be operating in conformance with historic operation standards, allocating at least one additional resource to the application, the at least one additional resource enabling the application to continue to operate in conformance with historic operation standards; and
when the application is determined to be operating at an efficiency level that is less than a predetermined threshold level of efficiency, flagging the application for remediation; and
transmitting a message over a communications network to a plurality of stakeholders, the message including:
the determination of whether the utilizing application is operating conforming to historic operation standards;
when the application is determined to be operating in conformance with historic operation standards, data relating to the additional resource; and
when the application is determined to not be operating in convention to historic operation standards, the flagging of the application for remediation;

wherein,
when the percentage of use of the resource received in the resource data segment relating to the resource is above the warning threshold and below the critical threshold, the message is a first message transmitted in a non-urgent manner; and
when the percentage of use of the resource received in the resource data segment relating to the resource is above the critical threshold, the message is a second message transmitted in an urgent manner.

2. The method of claim 1, wherein the non-urgent manner comprises an email transmitted daily until the percentage of use is determined to be below the warning threshold.

3. The method of claim 1, wherein the urgent manner comprises an urgent email transmitted every hour, said transmission occurring until the percentage of use is determined to be below the critical threshold.

4. The method of claim 1, wherein, a machine-learning algorithm is implemented on the platform, said machine-learning algorithm configured to:
retrieve historic resource data segments; and
based on the historic resource data segments:
allocate the plurality of resources; and
flag at least one portion of the plurality of resources as unused.

5. The method of claim 4, wherein the machine-learning algorithm reduces an average of the percentage of use of all the plurality of resources to less than an average of warning thresholds associated with each of the plurality of resources.

6. The method of claim 4, wherein the machine-learning algorithm reduces the percentage of use of a resource to less than the critical threshold determined for the resource.

7. The method of claim 4, wherein the machine-learning algorithm reduces an average of the percentage of use of all the plurality of resources to less than an average of critical thresholds associated with each of the plurality of resources.

8. The method of claim 1, wherein the remediating the application, when the percentage of use of the resource is above the critical threshold, may include terminating the application.

9. A distributed data platform comprising:
a plurality of clusters, each cluster including at least one node, each node being configured to execute at least one application;
a plurality of resources;
a processor configured to determine for each of the plurality of resources:
a critical threshold, being a percentage of use of the resource, wherein, when the percentage of use is greater than the critical threshold, the platform will incur an outage within a first predetermined time period, the outage incurred in at least one of:
the at least one application;
the at least one node;
a cluster including the node;
the plurality of clusters; and
the platform
a warning threshold, being a percentage of use of the resource, wherein when the percentage of use is greater than the warning threshold and less than the critical threshold, the percentage of use will reach the critical threshold within a second predetermined time period; and
an underuse threshold, being a percentage of use of the resource, wherein, when the percentage of use is below the underuse threshold, at least a predetermined portion of the resource is an unused portion;

a receiver module, said receiver module configured to receive resource data segments relating to current use of each resource of the plurality of resources, each resource data segment corresponding to a resource and including data corresponding to:
 a percentage of use of the resource;
 at least one application utilizing the resource;
 at least one node associated with the at least one application; and
 at least one cluster associated with the at least one node;
for each of the plurality of resources, the processor further configured to:
 when the percentage of use of the resource is received in a resource data segment relating to the resource is below the underuse threshold:
  flag at least a part of the unused portion as unallocated; and
  re-allocate the unused portion;
 when the percentage of use of the resource received in the resource data segment relating to the resource is above the underuse threshold and below the warning threshold:
  flag the use of the resource as satisfactory; and
  maintain the execution of the at least one application;
 when the percentage of use of the resource received in the resource data segment relating to the resource is above the warning threshold:
  determine whether the at least one application is conforming to historic operation standards as derived from historic application information;
   when the at least one application is determined to be operating in conformance to historic operation standards, allocate at least one additional resource to the application, the at least one additional resource facilitating the at least one application to continue to operate in conformance to historic operation standards;
   when the at least one application is determined to operating in contravention to historic operation standards, flag the at least one application for remediation; and
  transmit a message over a communications network to a plurality of stakeholders, the message including:
   the determination of whether the at least one application is operating in conformance with historic operation standards;
   when the application is determined to be operating in conformance with historic application standards, data relating to the additional resource; and
   when the application is determined to be operating in contravention to historic application standards, the flagging of the at least one application for remediation;
 wherein:
  when the percentage of use of the resource received in the resource data segment relating to the resource is above the warning threshold and below the critical threshold, the message is a first message transmitted in a non-urgent manner; and
  when the percentage of use of the resource received in the resource data segment relating to the resource is above the critical threshold, the message is a second message transmitted in an urgent manner.

10. The apparatus of claim 9, wherein, the non-urgent manner comprises an email transmitted daily until the use of the resource is determined to be below the warning threshold.

11. The apparatus of claim 9, wherein, the urgent manner comprises an urgently flagged email transmitted hourly until the use of the resource is determined to be below the critical threshold.

12. The apparatus of claim 9, wherein, when the percentage of use of the resource is above the critical threshold, the flagging the at least one application for remediation includes terminating the application.

13. The apparatus of claim 9, wherein, a machine-learning algorithm is implemented by the processor, said machine-learning algorithm configured to:
 retrieve historic resource data segments; and
 based on the historic resource data segments:
  allocate the plurality of resources; and
  flag at least one portion of the resources as unused.

14. The apparatus of claim 12, wherein the machine-learning algorithm reduces an average of the percentage of the use of the plurality of resources to less than an average of a plurality of warning thresholds associated with each of the plurality of resources.

15. The apparatus of claim 12, wherein the machine-learning algorithm reduces the percentage of the use of the resource to less than the critical threshold.

16. The apparatus of claim 12, wherein the machine-learning algorithm reduces an average of the percentage of use of the plurality of resources to less than an average of a plurality of critical thresholds associated with each of the plurality of resources.

* * * * *